US012562623B2

(12) United States Patent
Engelhardt

(10) Patent No.: US 12,562,623 B2
(45) Date of Patent: Feb. 24, 2026

(54) APPARATUS FOR COOLING AN ELECTRIC PROPULSION ENGINE

(71) Applicant: Dr. Ing. h.c. F. Porsche Aktiengesellschaft, Stuttgart (DE)

(72) Inventor: Tobias Engelhardt, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 284 days.

(21) Appl. No.: 18/348,392

(22) Filed: Jul. 7, 2023

(65) Prior Publication Data

US 2024/0022137 A1 Jan. 18, 2024

(30) Foreign Application Priority Data

Jul. 18, 2022 (DE) ..................... 10 2022 117 847.1

(51) Int. Cl.
| | |
|---|---|
| *H02K 1/20* | (2006.01) |
| *B64D 27/24* | (2006.01) |
| *B64D 33/08* | (2006.01) |
| *B64U 20/90* | (2023.01) |
| *B64U 20/94* | (2023.01) |

(Continued)

(52) U.S. Cl.
CPC ............. *H02K 9/197* (2013.01); *B64D 27/24* (2013.01); *B64D 33/08* (2013.01); *H02K 9/06* (2013.01); *H02K 9/193* (2013.01); *H02K 21/12* (2013.01)

(58) Field of Classification Search
CPC .. H02K 1/20; H02K 1/32; H02K 3/24; H02K 5/18; H02K 5/20; H02K 5/203; H02K 5/207; H02K 7/14; H02K 7/18; H02K 9/00; H02K 9/02; H02K 9/04; H02K 9/06; H02K 9/08; H02K 9/14; H02K 9/16; H02K 9/19; H02K 9/193; H02K 9/197; H02K 21/12; H02K 2209/00; B64D 27/24; B64D 33/08;

(Continued)

(56) References Cited

U.S. PATENT DOCUMENTS

| | | | | | |
|---|---|---|---|---|---|
| 4,739,204 | A | * | 4/1988 | Kitamura | ............... H02K 9/197 123/41.31 |
| 4,870,307 | A | * | 9/1989 | Kitamura | ............... H02K 9/197 123/41.31 |

(Continued)

FOREIGN PATENT DOCUMENTS

| | | | | | |
|---|---|---|---|---|---|
| CN | 101938191 | B | * | 11/2012 | ............... H02K 9/06 |
| CN | 105827066 | A | * | 8/2016 | ............... H02K 9/06 |

(Continued)

*Primary Examiner* — Edgardo San Martin
(74) *Attorney, Agent, or Firm* — LEYDIG, VOIT & MAYER, LTD.

(57) ABSTRACT

An apparatus for cooling an electric propulsion engine for an object, including a stator having a stator housing and a rotor, which is supported in a rotationally movable manner on the stator housing and is connected to a propulsion means for generating a force acting on the object, by a first coolant and a second coolant. The propulsion means generates a flow of the first coolant by rotational motion. The first coolant flows around or through the electric propulsion engine with aid of a flow guide, wherein the second coolant circulates in a cooling channel and transfers uptaken heat to the first coolant. The second coolant is circulated in the cooling channel with aid of a pump driven by the propulsion engine.

19 Claims, 3 Drawing Sheets

(51) Int. Cl.

| | |
|---|---|
| *B64U 20/96* | (2023.01) |
| *B64U 20/98* | (2023.01) |
| *H02K 1/32* | (2006.01) |
| *H02K 3/24* | (2006.01) |
| *H02K 5/20* | (2006.01) |
| *H02K 9/06* | (2006.01) |
| *H02K 9/08* | (2006.01) |
| *H02K 9/14* | (2006.01) |
| *H02K 9/19* | (2006.01) |
| *H02K 9/193* | (2006.01) |
| *H02K 9/197* | (2006.01) |
| *H02K 21/12* | (2006.01) |

(58) Field of Classification Search
CPC ......... F01D 25/12; F01D 25/08; B64U 20/96;
B64U 20/90; B64U 20/98; B64U 20/94
See application file for complete search history.

(56) References Cited

U.S. PATENT DOCUMENTS

| | | | | |
|---|---|---|---|---|
| 5,490,198 | A | 2/1996 | Gerling | |
| 5,698,912 | A * | 12/1997 | Rasch | H02K 9/19 |
| | | | | 475/161 |
| 6,856,053 | B2 * | 2/2005 | LeFlem | H02K 3/47 |
| | | | | 310/194 |
| 6,879,069 | B1 * | 4/2005 | Weidman | H02K 9/197 |
| | | | | 310/61 |
| 7,102,267 | B2 * | 9/2006 | Gromoll | H02K 9/225 |
| | | | | 310/58 |
| 9,325,224 | B2 * | 4/2016 | Vander Lind | F03D 80/60 |
| 10,784,750 | B2 | 9/2020 | Gerstler et al. | |
| 11,271,455 | B2 | 3/2022 | Teofili | |
| 11,283,327 | B2 | 3/2022 | Vermeulen | |
| 11,623,508 | B2 | 4/2023 | Oechslen | |
| 11,679,872 | B1 * | 6/2023 | Tulsyan | B64D 33/08 |
| | | | | 244/12.4 |
| 11,794,913 | B2 * | 10/2023 | Lacaux | B64D 27/34 |
| 11,845,477 | B2 * | 12/2023 | Kueter | H02K 9/197 |

| | | | | |
|---|---|---|---|---|
| 12,294,283 | B2 * | 5/2025 | Renotte | H02K 9/14 |
| 2006/0017334 | A1 * | 1/2006 | Gotmalm | H02K 9/197 |
| | | | | 310/64 |
| 2007/0295568 | A1 * | 12/2007 | Vasilescu | H02K 1/32 |
| | | | | 188/274 |
| 2014/0167894 | A1 | 6/2014 | Jajtic et al. | |
| 2015/0097450 | A1 * | 4/2015 | Xu | H02K 9/197 |
| | | | | 310/54 |
| 2021/0013768 | A1 * | 1/2021 | Schöll | F02K 5/00 |
| 2021/0036580 | A1 * | 2/2021 | Cottrell | B64U 10/13 |
| 2022/0190655 | A1 | 6/2022 | Wehlen et al. | |
| 2022/0416613 | A1 * | 12/2022 | Goykhman | H02K 21/24 |
| 2023/0155454 | A1 * | 5/2023 | McClelland | H02K 3/24 |
| | | | | 310/54 |
| 2024/0413711 | A1 * | 12/2024 | Joshi | H02K 5/203 |

FOREIGN PATENT DOCUMENTS

| | | | | | |
|---|---|---|---|---|---|
| CN | 107276271 | A | * | 10/2017 | H02K 9/193 |
| CN | 107508423 | A | * | 12/2017 | H02K 9/06 |
| CN | 110365163 | A | * | 10/2019 | H02K 9/06 |
| CN | 116169831 | A | * | 5/2023 | H02K 9/06 |
| CN | 116280330 | A | * | 6/2023 | B64D 33/08 |
| CN | 118868456 | A | * | 10/2024 | H02K 5/18 |
| DE | 4304760 | A1 | | 8/1994 | |
| DE | 10122425 | A1 | * | 11/2002 | H02K 5/207 |
| DE | 102013102194 | A1 | | 9/2014 | |
| DE | 102017212798 | A1 | | 1/2019 | |
| DE | 102018113319 | A1 | * | 12/2019 | H02K 9/197 |
| DE | 102018132145 | A1 | | 6/2020 | |
| DE | 102019205762 | A1 | | 10/2020 | |
| DE | 102019117893 | A1 | | 1/2021 | |
| EP | 0984548 | A1 | * | 3/2000 | H02K 5/20 |
| EP | 2600504 | A1 | * | 6/2013 | H02K 9/227 |
| EP | 2721722 | B1 | | 10/2015 | |
| EP | 3091638 | A1 | * | 11/2016 | H02K 5/20 |
| FR | 2859325 | A1 | * | 3/2005 | H02K 49/043 |
| JP | 2010172129 | A | * | 8/2010 | |
| KR | 20020026103 | A | * | 4/2002 | H02K 9/04 |
| KR | 20140097676 | A | * | 8/2014 | H02K 11/30 |
| KR | 102655341 | B1 | * | 4/2024 | H02K 9/197 |
| WO | WO-2019008220 | A1 | * | 1/2019 | H02K 5/203 |

* cited by examiner

APPARATUS FOR COOLING AN ELECTRIC PROPULSION ENGINE

CROSS REFERENCE TO RELATED APPLICATIONS

This application claims benefit to German Patent Application No. DE 10 2022 117 847.1, filed on Jul. 18, 2022 which is hereby incorporated by reference herein.

FIELD

The invention relates to an apparatus for cooling an electric propulsion engine.

BACKGROUND

From DE 1020 17 212 798 A1, an electric motor with an integrated cooling apparatus is known, which uses bleed air as the primary coolant for cooling the stator and/or the rotor. The bleed air is drawn from the air flow of a propeller attached to the electric motor. Cooling channels are integrated into the stator housing, which direct the primary coolant in a targeted manner towards the components to be cooled. The stator is cooled by a secondary coolant via an annular heat exchanger arranged coaxially with respect to the stator, wherein the exact manner of cooling the stator via the secondary coolant is not disclosed in DE 10 2017 212 798 A1.

SUMMARY

In an embodiment, the present disclosure provides an apparatus for cooling an electric propulsion engine for an object, comprising a stator having a stator housing and a rotor, which is supported in a rotationally movable manner on the stator housing and is connected to a propulsion means for generating a force acting on the object, by a first coolant and a second coolant. The propulsion means generates a flow of the first coolant by rotational motion. The first coolant flows around or through the electric propulsion engine with aid of a flow guide, wherein the second coolant circulates in a cooling channel and transfers uptaken heat to the first coolant. The second coolant is circulated in the cooling channel with aid of a pump driven by the propulsion engine.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
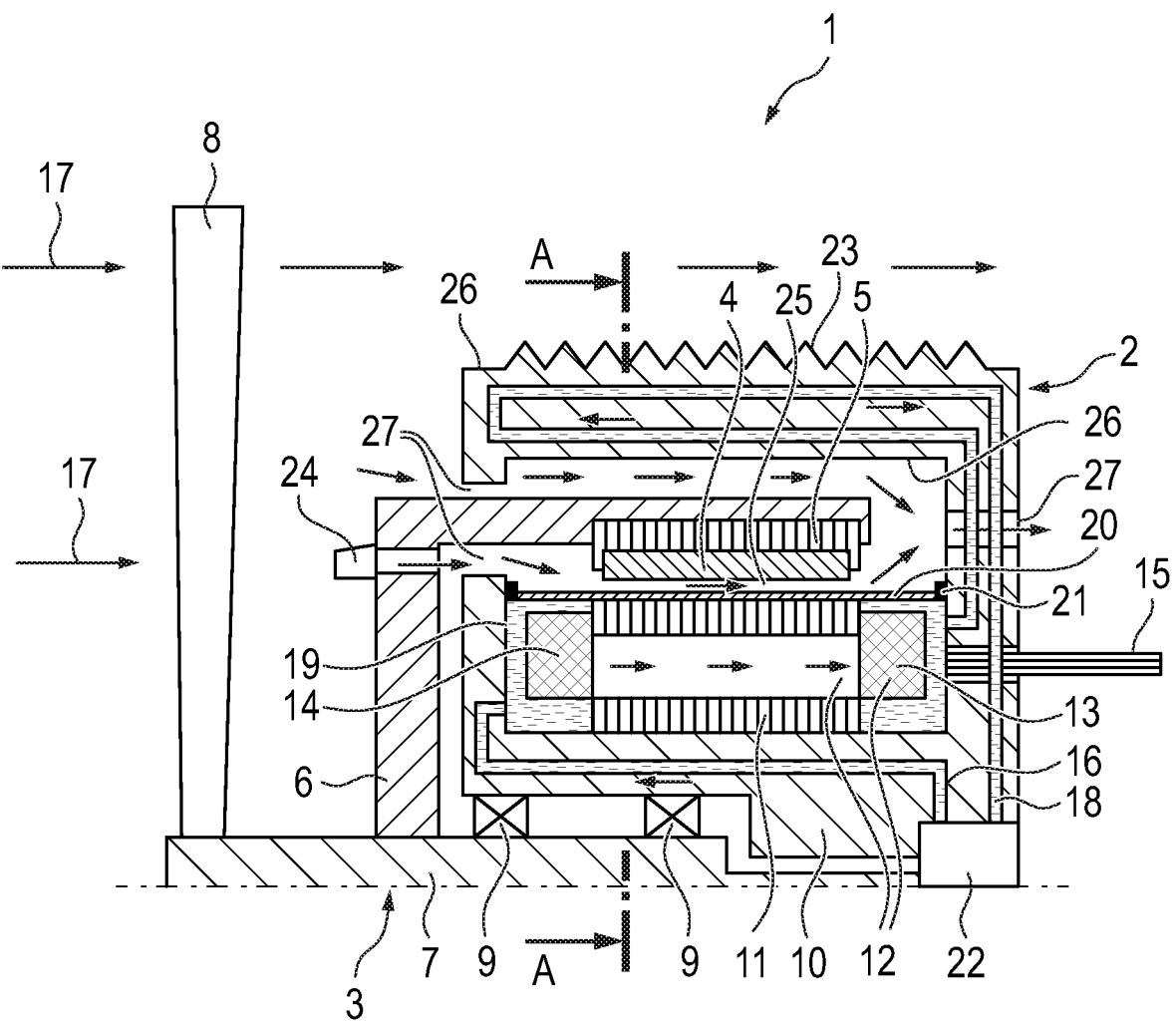
FIG. 1 illustrates an axial partial section of a propulsion engine with an embodiment example of a cooling apparatus.

In an embodiment, the present invention provides a particularly high-performance apparatus for cooling an electric motor having a high torque density.

In an embodiment, the described apparatus serves to cool an electric propulsion engine for an object. The propulsion engine comprises a stator having a stator housing and a rotor supported on the stator housing in a rotationally movable manner. A propulsion means for generating a force acting on the object is connected to the propulsion engine.

The propulsion engine is cooled by first and second coolant, in that the propulsion means generates a flow of the first coolant by a rotational motion and introduces it into the electric propulsion engine by means of means for flow guidance, whereby the coolant flows around and/or through it.

The second coolant is circulated in a circuit, wherein it transfers uptaken heat to the first coolant.

Preferably, the second coolant is circulated in the circuit by means of a pump driven by the propulsion engine. By circulating the second coolant, the coolant can receive heat generated at one point and output it at another point.

By placing the pump coaxially to the axis of the rotor, it is driven directly by the propulsion engine and thus no means for rotational transfer, e.g. gears and/or belts, are necessary.

The second coolant flows through the stator comprising the winding heads and the coils extending in stator grooves axially to the axis of the drive.

Preferably, the second coolant flows through the stator grooves in the axial direction and is in direct contact with the coils in order to directly take up and remove the resulting heat there.

There is a gap between the stator and the rotor. With a particularly thin design of the gap, the losses of the magnetic field acting between the stator and rotor can be kept low. The gap through which the first coolant flows is sealed against the region in which the second coolant flows by means of a solid or flexible thin-walled canned tube.

Preferably, according to an embodiment of the invention, the second coolant flows through the stator comprising winding heads, coils, and cooling channels in the following sequence:

via a first winding head of the stator, and/or via the coils of the stator, and/or via a second winding head of the stator, and/or via cooling channels through a stator housing placed radially outside the rotor carrier, and/or via the coolant pump.

According to an embodiment of the invention, the second coolant flows through the stator in the following sequence:

entering centrally to the coils, via the coils of the stator to its axially external ends, and/or parallel via both winding heads, and/or via cooling channels through a stator housing placed radially outside the rotor carrier, and/or via the coolant pump.

Preferably, the second coolant is a dielectric medium having a maximum density of 0.75 kg/l at 15° C. and/or a maximum viscosity of 6 mm$^2$/s at 40° C. and/or a minimum thermal capacity of 2.3 kJ/(kg*K) at 80° C. and/or a minimum thermal conductivity of 0.12 W/(m/K) at 80° C. and/or a maximum electrical conductivity of 1000 nS/m at 25° C.

Due to the low electrical conductivity, the dielectric medium has an electrical insulation effect, which allows it to be in direct contact with live components without causing a short circuit.

Due to the low viscosity, the dielectric medium can be guided directly through very small interstices between the coils in the grooves without the hydraulic pressure loss and the resulting pressure level in the dielectric medium becoming too high.

By combining these material properties, the heat can be uptaken and removed directly at the point of origin.

In an embodiment of the invention, the propulsion engine is cooled by a first and a second coolant, in that the propulsion means generates a flow of the first coolant by rotational motion and introduces it into the electric propulsion engine with the aid of means for flow guidance, whereby the coolant flows around and/or through it.

The second coolant circulates through the pump in the circuit, transferring uptaken heat to the first coolant.

The stator housing is arranged in the flow of the first coolant such that a thermal loss transported in the second coolant through the stator housing is output to the first coolant via the surface of the stator housing. It is particularly advantageous in this respect that the existing propulsion means takes on a further function for conveying the first coolant.

Preferably, housing walls, housing openings, blade geometries, and/or compressor geometries are provided as means for flow guidance.

Preferably, the stator housing has a surface enlargement, for example by cooling fins, for better heat transfer between the coolants.

Preferably, the propulsion means extends in a radial direction predominantly beyond the stator housing.

Preferably, the propulsion engine is configured as an external rotor. This means that the active portion of the rotor is located radially outside the active portion of the stator. Active portions of the stator and rotor refer to the portions that generate a force due to their magnetic effect. Due to the embodiment as an external rotor, the diameter of the annular gap is particularly large, whereby the radially external flat rotor allows for a particularly advantageous compact design of the propulsion engine.

Preferably, the rotor comprises surface magnets located on the radial interior of the rotor.

As a result, the distance between the magnets of the rotor and the coils of the stator can be kept as low as possible, which has a particularly advantageous effect on the efficiency of the propulsion engine. In addition, this embodiment allows for a particularly flat rotor and thus a very compact propulsion engine.

Preferably, the rotor sheet package and/or the stator sheet package consist of a plurality of iron-cobalt sheets.

Preferably, the electric propulsion engine is a permanently stimulated synchronous machine.

Preferably, the propulsion engine is used in a flight object.

Without being restricted thereto, embodiment examples of the invention will be explained in greater detail with reference to the figures.

FIG. 1 shows an axial partial section of a propulsion engine 1 with a first embodiment example of the cooling apparatus according to embodiments of the invention. The propulsion engine 1 comprises a stator 2 and a rotor 3.

The rotor 3 comprises magnets 4 that are attached to the rotor sheet package 5 as well as a rotor carrier 6 that receives the rotor sheet package 5. The rotor carrier 6 is connected to the rotor shaft 7. The propulsion means 8 is attached to the axially external end of the rotor shaft 7.

In this preferred embodiment, the propulsion means 8 is a propeller, which accelerates the first coolant 17, here in particular air, by rotational motion in a direction axial to the propulsion engine, whereby a counterforce acts on the propeller and thus on the propulsion engine 1. By attaching one or more propulsion engines 1 to an object 29, this force acts on the object 29, whereby the object 29 can be moved in a direction. The force acting on the object 29 is dependent on the configuration of the propulsion engines 1 as well as the speed of the propulsion means 8.

In this preferred embodiment example, the propulsion engine 1 is configured as an external rotor; this means that the rotor sheet package 5 extends outside the stator sheet package 11. A gap 25 is located between the rotor 3 and the stator 2, in which the first coolant 17, here in particular air, flows and thereby cools the stator 2 and the rotor 3. Due to the embodiment as an external rotor, the diameter of the annular gap 25 is particularly large, whereby the radially external flat rotor 3 allows for a particularly advantageous compact design of the propulsion engine 1.

The rotor 3 is connected to the stator 2 via a bearing 9 in a radially rotational manner.

The stator 2 comprises a stator housing 10 that receives the stator sheet package 11. In the stator sheet package 11, the coils 12 are made of an electrically conductive material, preferably copper. At both axial ends of the coils 12, there is a respective winding head 13 and 14.

The coils 12 are connected via the AC terminals 15 to a power supply, for example an inverter.

The stator housing 10 also comprises cooling channels 16 through which a second coolant 18 flows.

In a preferred embodiment, this second coolant 18 is an electrically non-conductive liquid medium, whereby the second coolant 18 can flow directly to the current-conducting components, such as a coil 12 and/or AC terminal 15 and can thus take up and/or output heat in a highly effective manner.

The stator region 19 through which the second coolant 18 flows is fluidly sealed by a thin-walled, canned element 20 against the gap 25 located between the rotor 3 and the stator 2. The canned element 20 can be manufactured as a hard component, for example by transfer molding or by an injection molding process. In a further embodiment, the canned element 20 can also be manufactured as a flexible element, for example from glass fiber-reinforced plastics. The canned element 20 is sealed against the stator housing 10 with the aid of canned seals 21. The second coolant 18 can be conveyed through the stator housing 10 by means of a pump 22 within the cooling channel 16. In this exemplary embodiment, the pump 22 is placed axially to the rotor shaft 7 and is connected to the rotor shaft 7.

A rotation generated by the propulsion engine 1 also drives the pump 22. The pump 22 can be operated at the rotor speed and/or by a speed transmission at a different speed than the rotor speed. Rotating the pump 22 causes the second coolant 18 to be pumped into the cooling channels 16 through the stator housing 10.

In the embodiment shown herein, the stator housing 10 radially encloses the rotor carrier 6, thereby causing the stator housing 10 to be located radial inside as well as radially outside the rotor carrier 6. The stator housing 10 can have surface enlargements 23 in the form of, for example, cooling fins.

With the aid of means for flow guidance 24, the first coolant 17, which in this case can preferably be a gaseous fluid, for example air, can be guided in a targeted manner through and/or around the propulsion engine 1. Means for flow guidance 24 are, for example, fluid-impermeable housing walls 26 that guide the fluid flow or housing openings 27 that in a targeted manner allow a fluid to flow into and/or out of the propulsion engine 1 at certain positions. Means for flow guidance 24 can also be blade geometries/compressor geometries 28, which can accelerate and/or compress the first coolant 17 by the rotational motion generated by the propulsion engine 1. The flow of the first coolant 17 generated by the propulsion means 8 can thereby be guided in a targeted manner through the stator housing 10 past the rotor 3, whereby the first coolant 17 takes up waste heat from components to be cooled, for example the rotor sheet package 5 and/or the magnet 4, and thereby cools these components.

The first coolant 17, which is caused to flow by the propulsion means 8, also flows along the housing wall 26 of the stator housing 10. The second coolant 18, which is caused to flow by the pump 22 and can preferably be a liquid fluid, for example a non-conductive liquid, flows through the stator housing 10, thereby outputting the uptaken heat via the housing wall 26 to the first coolant 17. It is particularly advantageous for the cooling channel 16 to be placed proximate to the housing wall 26 around which the first coolant 17 flows, whereby the thermal resistance between the first coolant 17 and the second coolant 18 is kept low.

Figure 2:
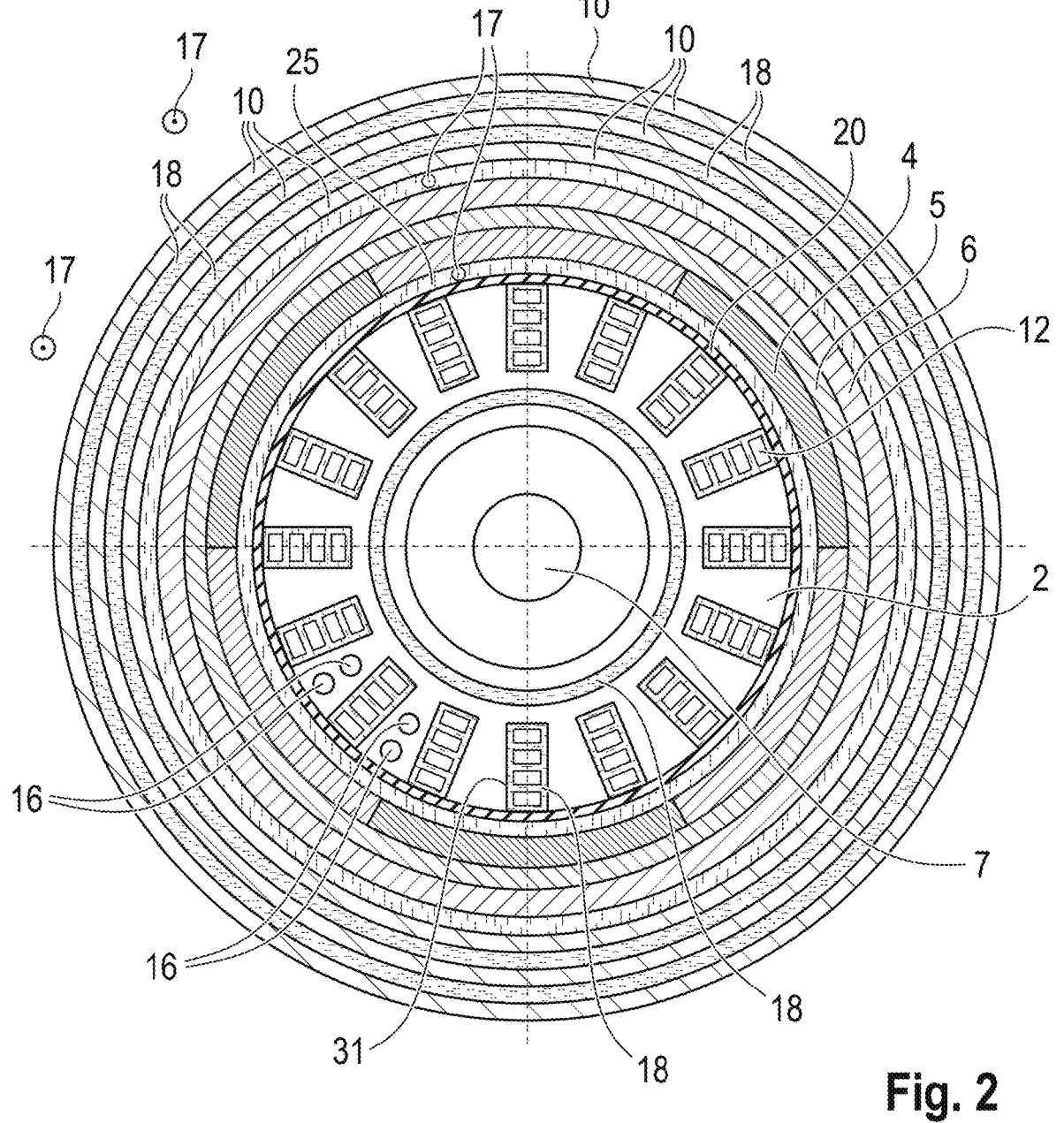
FIG. 2 illustrates a radial section of the propulsion engine in FIG. 1 according to section line A-A.

FIG. 2 shows a radial section of the propulsion engine 1 in FIG. 1 according to section line A-A.

The portion of the rotor 3 radially enclosed by the stator 2 comprises the rotor sheet package 5, which is located radially outside the magnet 4 received by the radially outside rotor carrier 6.

The magnets 4 are preferably designed as surface magnets, so that the distance between the magnets 4 of the rotor 3 and the coils 12 of the stator 2 is as small as possible, which has a particularly advantageous effect on the efficiency of the propulsion engine 1.

In one embodiment example, the surface magnets can be placed in a Halbach array.

The Halbach array is a specific configuration of permanent magnets, whose direction of magnetization towards one another is tilted 900 in the direction of the longitudinal axis of the array.

With this preferred embodiment, the rotor can be kept particularly flat.

When operating the apparatus in a limited operating range, the surface magnets having a high magnetic mass and a high flux can achieve a high efficiency in this limited operating range while increasing the torque density.

The stator 2 has axial grooves 31 in which the coils 12 are located. In this embodiment, the second coolant 18 flows directly in the grooves 31 along the coils 12 as well as radially outward through the stator housing 10.

With this particularly efficient cooling, a high current density can be provided in the coils 12, whereby a high number of turns can be provided in the coils 12 and thus a high torque density. Due to the high current density, the grooves can also be designed small, thereby increasing the material content of the stator sheet package 11, which leads to a particularly advantageous flow guidance and thereby in turn a high torque density.

The first coolant 17 flows in the axial direction outside of the stator housing 10 as well as in the gap 25 between the rotor 3 and the stator 2 and is illustrated in FIG. 2 by arrows, which point outwardly from the leaf direction in the solder.

This particularly advantageous flow of the first coolant 17 can, in a targeted manner, take up waste heat from components to be cooled, for example from the rotor sheet package 5 and/or the magnet 4, in order to cool these components. With this cooling, for example, magnets 4 can be used having a particularly high residual flow density but in turn having a low temperature strength.

The second coolant 18 can also flow through cooling channels 16 that extend axially through the stator sheet package 11. These cooling channels 16 can be arranged in addition to or alternatively to a direct flow through the grooves 31.

FIG. 2 also shows the sealing of the stator region 19 through which the second coolant flows against the gap 25 with the aid of the canned element 20. It is particularly advantageous here that, due to this sealing, the second coolant 18 does not come into contact with the rotor that is movable in the rotational direction. This can reduce frictional losses during operation of the propulsion engine 1.

Figure 3:
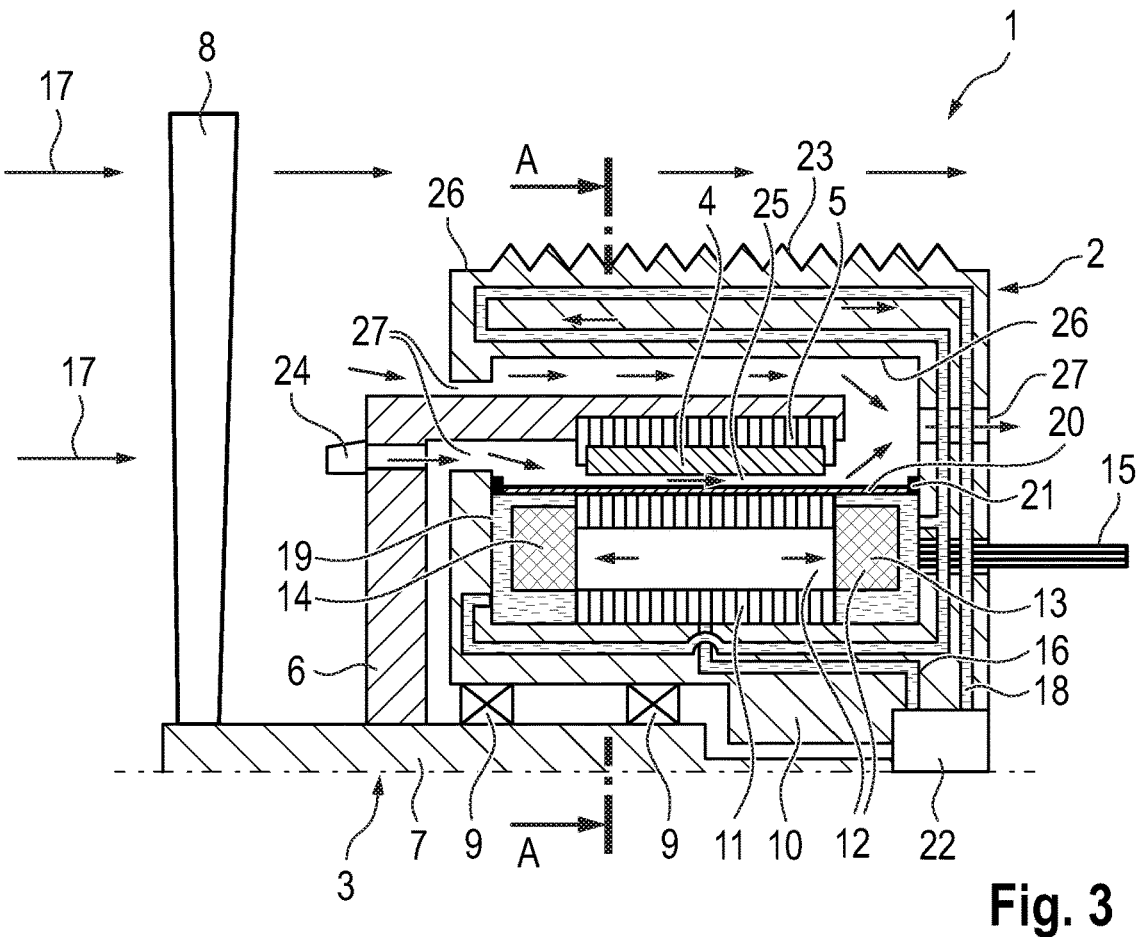
FIG. 3 illustrates an axial partial section of a propulsion engine with an embodiment example of a cooling apparatus.

FIG. 3 shows a stator housing 10 with an alternative cooling channel assembly. The second coolant 18, which is characterized by the corresponding hatching, flows centrally to the stator coil 12 and is then divided into two parallel flow paths. A first part of the second coolant 18 subsequently flows via a first winding head 13, and a second portion of the second coolant 18 flows via a second winding head 14 and is subsequently merged into a cooling channel 16. The second coolant 18 then flows through the radially outside portion of the stator housing 10 to the pump 22 and is pumped by the latter towards the stator coil 12, thereby closing the circuit.

Figure 4:
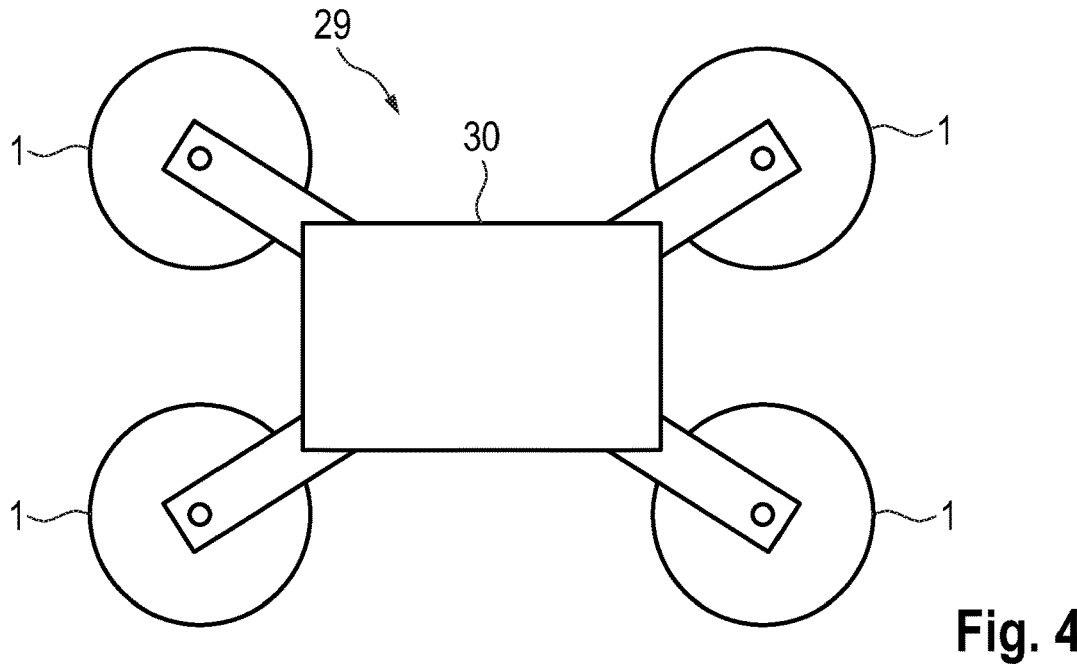
FIG. 4 illustrates a plan view of an object with the propulsion engine according to an embodiment of the invention.

FIG. 4 shows a plan view of an object 29 with four propulsion engines 1 according to an embodiment of the invention. These propulsion engines 1 are mounted outside the base body 30 of the object 29. Upon a rotation of the propulsion means 8 mounted on the propulsion engine 1, there is a flow of the first coolant 17 in one direction, whereby a force opposite the direction of flow of the first coolant 17 acts on the object 29. The amount of the acting force can be varied with the aid of a variation of the propulsion speed, whereby the object 29 can move in the direction of action of the force.

In further embodiments, an object 29 with more than four propulsion engines 1, or an object 29 with fewer than four propulsion engines 1, would also be possible. The forces generated by the propulsion means can act in different directions, which can affect the direction of movement of the object.

The first coolant 17, which, when displaced by the propulsion means 8, generates a force on the propulsion engine 1, can be a gaseous fluid and/or a liquid fluid.

The object 1 can be an object for conveying persons and/or other objects.

The transfer of heat from the first coolant 17 to the second coolant 18 can transfer heat from the first coolant 17 to the second coolant 18 by a positive sign, thereby reducing the heat content in the first coolant 17.

The heat transfer from the first coolant 17 to the second coolant 18 can also have a negative sign, thereby transferring heat from the second coolant to the first coolant 17, thereby increasing the heat content of the first coolant 17.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMBERS

1. Propulsion engine
2. Stator
3. Rotor
4. Magnets
5. Rotor sheet package
6. Rotor carrier
7. Rotor shaft
8. Drive means
9. Bearing
10. Stator housing
11. Stator sheet package
12. Coils
13. Winding head 1
14. Winding head 2
15. AC terminal
16. Cooling channel
17. First coolant
18. Second coolant
19. Stator region flowed through
20. Canned element
21. Canned seal
22. Pump
23. Surface enlargement
24. Means for flow guidance
25. Gap
26. Housing wall
27. Housing opening
28. Blade geometry/Compressor geometry
29. Object
30. Base body of an object
31. Grooves

The invention claimed is:

1. An apparatus for cooling an electric propulsion engine for an object, comprising:
   a stator having a stator housing; and
   a rotor, which is supported in a rotationally movable manner on the stator housing and is connected to a propulsion means for generating a force acting on the object, by a first coolant and a second coolant, wherein the propulsion means generates a flow of the first coolant by rotational motion,
   wherein the first coolant flows around or through the electric propulsion engine with aid of a flow guide,
   wherein the second coolant circulates in a cooling channel and transfers uptaken heat to the first coolant, and
   wherein the second coolant is circulated in the cooling channel with aid of a pump driven by the propulsion engine.

2. The apparatus according to claim 1, wherein the pump is placed coaxially to the axis of the rotor.

3. The apparatus according to claim 1, wherein the stator comprises winding heads and coils which extend in grooves aligned axially to the axis of the drive, and
   wherein the second coolant axially flows through the grooves in direct contact with the coils.

4. The apparatus according to claim 1, wherein there is a gap between the stator and the rotor, and
   wherein a stator region through which the second coolant flows is sealed against the gap by a solid or flexible, thin-walled, canned element.

5. The apparatus according to claim 1, wherein the stator comprises winding heads, coils, and cooling channels, and
   wherein a flow of the second coolant circulates:
   via a first winding head of the winding heads of the stator, and/or
   via the coils of the stator, and/or
   via a second winding head of the winding heads of the stator, and/or
   via cooling channels through a stator housing placed radially outside the rotor carrier, and/or
   via the pump.

6. The apparatus according to claim 1, wherein the stator comprises winding heads, coils, and cooling channels, and
   wherein a flow of the second coolant circulates
   centrally via the coils of the stator and/or
   parallel via the winding heads, and/or
   via cooling channels through the stator housing placed radially outside the rotor carrier, and/or
   via the pump.

7. The apparatus according to claim 1, wherein the second coolant is a dielectric medium having a maximum density of 0.75 kg/l at 15° C. and/or a maximum viscosity of 6 mm²/s at 40° C. and/or a minimum thermal capacity of 2.3 kJ/(kg*K) at 80° C. and/or a minimum thermal conductivity of 0.12 W/(m/K) at 80° C. and/or a maximum electrical conductivity of 1000 nS/m at 25° C.

8. An apparatus for cooling an electric propulsion engine for an object, comprising:
   a stator having a stator housing; and
   a rotor, which is supported in a rotationally movable manner on the stator housing and is connected to a propulsion means for generating a force acting on the object, by a first coolant and a second coolant,
   wherein the propulsion means generates a flow of the first coolant by rotational motion, wherein the first coolant flows around or through the electric propulsion engine with aid of a flow guide,
   wherein the flow guide directs the flow of the first coolant generated by the propulsion means in a targeted manner through the stator housing to the components to be cooled,
   wherein the second coolant circulates in a cooling channel and transfers uptaken heat to the first coolant, wherein the second coolant is circulated in the cooling channel with aid of a pump driven by the propulsion engine, and wherein the stator housing is arranged in the flow of the first coolant such that a thermal loss transported in the second coolant through the stator housing is output to the first coolant via a surface of the stator housing.

9. The apparatus according to claim 8, wherein the flow guide comprises housing walls, housing openings, blade geometries, and/or compressor geometries.

10. The apparatus according to claim 8, wherein the stator housing has a surface enlargement for better heat transfer from the second coolant to the first coolant.

11. The apparatus according to claim 8, wherein the propulsion means extends in a radial direction predominantly beyond the stator housing.

12. The apparatus according to claim 8, wherein the propulsion engine is an external rotor.

13. The apparatus according to claim 8, wherein the rotor comprises surface magnets located on a radial interior of the rotor.

14. The apparatus according to claim 8, wherein the rotor sheet package and/or the stator sheet package include a plurality of iron-cobalt sheets.

15. The apparatus according to claim 8, wherein the electric propulsion engine is a permanently stimulated synchronous machine.

16. A propulsion engine for a flight object having the apparatus according to claim 1.

17. The apparatus according to claim 1, wherein the rotor comprises an axis of rotation on a first side of the stator and a magnetic element on a second side of the stator opposite the first side, and wherein the flow guide guides the first coolant flow past a radial inner side of the magnetic element of the rotor, a radial outer side of a canned element of the stator, and a portion of the cooling channel.

18. The apparatus according to claim 17, wherein a bearing is interposed between the rotor and the stator on the first side of the stator.

19. An apparatus for conveying persons or objects, the apparatus comprising:

a base body;

an electric motor, the electric motor comprising:

a stator having a stator housing coupled to the base body; and a rotor, which is supported in a rotationally movable manner by the stator housing and comprises a rotor carrier coupled to a rotor shaft, the stator housing at least partially radially enclosing the rotor carrier;

a propeller coupled to an axially external end of the rotor shaft, the propeller being configured to be rotationally driven by the electric motor to a generate a propulsive force for moving the apparatus and to generate a flow of a fluid directed at the stator housing; and a pump connected to the rotor shaft and arranged coaxially the rotor shaft such that it is configured to be directly driven by the rotor shaft, wherein the fluid is configured to be directed through the stator housing to components to be cooled by a flow guide, the flow guide comprising: a fluid impermeable housing wall portion of the stator housing; an opening between the stator housing and the rotor carrier configured to allow the fluid to flow into or out of the electric motor at predetermined positions; or a blade or compressor geometry feature of the electric motor configured to accelerate or compress the fluid in conjunction with the rotational movement of the rotor, and wherein the pump is configured to circulate a coolant in a cooling channel, which is arranged proximate to a wall of electric motor, such that the coolant transfers uptaken heat to the fluid via the wall.

* * * * *